United States Patent [19]

Wright et al.

[11] Patent Number: 4,580,223

[45] Date of Patent: Apr. 1, 1986

[54] INCORPORATION OF PITCH BIAS ACTUATOR FUNCTION INTO AN EXISTING AFCS

[75] Inventors: Stuart C. Wright, Woodbridge; Richard D. Murphy, Trumbull; Don L. Adams, Fairfield, all of Conn.

[73] Assignee: United Technologies Corporation, Hartford, Conn.

[21] Appl. No.: 549,387

[22] Filed: Nov. 7, 1983

[51] Int. Cl.⁴ .................... G06F 15/50; G06F 7/78
[52] U.S. Cl. .................... 364/434; 244/17.13; 244/177; 244/182
[58] Field of Search .................... 364/433, 434; 244/17.13, 177, 178, 180–182

[56] References Cited

U.S. PATENT DOCUMENTS

| | | | |
|---|---|---|---|
| 4,168,045 | 9/1979 | Wright et al. | 364/433 |
| 4,371,937 | 2/1983 | Adams et al. | 244/17.13 |
| 4,371,938 | 2/1983 | Wright et al. | 244/17.13 |
| 4,382,283 | 5/1983 | Clelford et al. | 244/177 |
| 4,385,355 | 5/1983 | Verzella et al. | 244/17.13 |
| 4,385,356 | 5/1983 | Verzella et al. | 244/17.13 |

*Primary Examiner*—Gary Chin
*Attorney, Agent, or Firm*—Gerald E. Linden

[57] ABSTRACT

An aircraft automatic flight control system (AFCS) includes a pair of fast, limited authority inner loop actuators responsive to signals indicative of aircraft attitude or other flight parameters such as airspeed, the inner loop being recentered by an outer loop actuator responsive to attitude or other aircraft parameter-indicating signals (54,55). Commands applied to the outer loop are applied in a lagged fashion in opposite direction so as to drive the inner loop actuators back toward the center of their authority. The rate of response of the outer loop is adaptive in response to magnitude of inner loop input (101, FIG. 2). A pitch bias command is provided to the inner loop as a function of airspeed multiplied inversely with collective pitch, and as a function of the rate of change of collective stick position, so as to provide a positive static pitch trim gradient and decouple collective pitch from the longitudinal cyclic pitch channel. When the inner loop runs out of authority, the outer loop may assume a high gain mode to keep pace with the demand of the pitch bias function. When the AFCS is operating single-on, the outer loop response is normally delayed for three seconds to allow a pilot time to recover from a hardover. However, when a collective maneuver is being made, the outer loop response is not delayed so as not to interfere with the pitch bias function, especially with regard to collective decoupling.

2 Claims, 4 Drawing Figures

INCORPORATION OF PITCH BIAS ACTUATOR FUNCTION INTO AN EXISTING AFCS

TECHNICAL FIELD

This invention relates to helicopter controls and, more particularly, to offsetting certain undesirable handling characteristics.

BACKGROUND ART

The stability characteristics of helicopters are very complex and vary widely from one helicopter design to the next. Just about every individual characteristic of a helicopter affects stability in one way or another. There are certain attributes of helicopter response which are desirable for flight stability per se, and others which are desirable from the point of view of consistent response to pilot input.

It is desirable for flight stability per se to decouple the collective pitch from the longitudinal pitch axis of the helicopter. Coupling of collective pitch and longitudinal pitch axis is largely a result of locating the center of gravity aft of the center of lift. This offset causes rotations of the helicopter in its longitudinal pitch axis as a result of increases or decreases in collective pitch. In order to compensate for the coupling from collective pitch to the longitudinal pitch axis the pilot must move the cyclic stick longitudinally during collective maneuevers which increases pilot workload. An AFCS pitch channel is not normally designed to compensate for pitch perturbations of the magnitude and rate that result from collective pitch coupling.

It is desirable from the point of view of consistent response to pilot input and consistent pilot reaction to operating conditions, responses, and external perturbations to achieve positive angle of attack stability and positive speed stability, which combine to provide a desired positive relationship between longitudinal cyclic pitch stick position and airspeed (with other controls fixed), which is referred to herein as positive static pitch trim gradient. In other words, it is desirable that, with the throttle and collective pitch held constant, in maneuevering flight a rearward movement of the cyclic control is necessary to obtain a speed less than the trim speed, and a forward movement of the cyclic control is necessary to obtain a speed greater than the trim speed. As a correlary to the stability achieved by a positive static pitch trim gradient, the pilot is provided with a correct relative feel in the cyclic pitch stick; that is, the increased force, which the pilot must provide to the stick to achieve trim at increasingly forward positions, provides a relative indication of speed and/or longitudinal pitch axis inclination, on a continuous basis for any stick position, regardless of undesireable external inputs to the control system by the environment, or inadvertent pilot inputs.

An AFCS pitch channel that provides attitude hold and stability functions typically is not operable to decouple the collective and pitch axes and does not address the problem of providing positive static pitch trim gradient when it is otherwise not inherent in the handling characteristics of a helicopter. Therefore, it is known to provide a pitch bias actuator (PBA), such as an extensible link, in the longitudinal cyclic pitch channel of a helicopter with inputs as a function of airspeed multiplied inversely by collective pitch, and as a function of the rate of change of collective pitch stick position, so as to provide positive static pitch trim gradient and to decouple collective pitch from the longitudinal cyclic pitch channel at cruise airspeeds. Such a system is disclosed in U.S. Pat. No. 4,168,045 (Wright et al., 1979) entitled SPEED AND COLLECTIVE PITCH BIAS OF HELICOPTER LONGITUDINAL CYCLIC PITCH, which is incorporated by reference herein. A drawback to providing a PBA in the longitudinal cyclic pitch channel of a helicopter is the additional hardware involved, which translates into increased cost and weight and decreased reliability. Therefore it would be desirable to provide the PBA function in an existing AFCS longitudinal pitch channel. However, the PBA function requires upwards of 5% per second rate and 30% authority in order to be effective. This combination of rate and authority is not attainable in a traditional automatic flight control system (AFCS) that has a trim loop with only 2 to 3% per second rate and 100% authority, and a stability loop with 30 to 100% per second rate and only ±10% authority, said loops operating independently of each other. Therefore, the PBA system of the prior art uses a separate medium-rate/-medium-authority actuator. In addition to the lack of compatability of the PBA function with a typical AFCS, biasing the inner loop is contrary to the null-maintaining function of the inner loop. Biasing the inner loop would reduce its available authority or completely saturate it. On the other hand, providing the PBA function in the outer loop would not "bias" the channel in the sense that a different control stick position is required for the same rotor blade pitch.

Another problem associated with providing a PBA function in an existing AFCS occurs when the AFCS is operating "single-on," or in other words with one of two redundant inner loop stability augmentation (SAS) channels shut down due to a fault. In order to prevent a hardover in the remaining SAS channel from causing an undesirable response in the aircraft, it is known to delay outer loop (trim) commands by three seconds while operating single-on so that the trim actuator, which is driven by the amplifier associated with the remaining SAS channel, does not add to the problem. In the context of providing the PBA function in the AFCS as taught hereinafter, the outer loop delay would render the PBA function virtually useless during the first three seconds of a collective maneuver in which collective coupling can cause significant responses in the pitch axis, rather quickly, thereby demanding increased pilot attention to maintaining or achieving a flight attitude.

DISCLOSURE OF INVENTION

Therefore, it is an object of this invention to provide an AFCS having sufficient rate and authority to accommodate the PBA function.

It is another object of this invention to provide the PBA function in a digital AFCS wherein the function may be incorporated as a software change. It is a further object of this invention to provide for said PBA function when the AFCS is operating single-on.

According to the present invention, an aircraft automatic flight control system (AFCS) utilizes signals derived from aircraft flight parameter sensors to drive a fast, limited authority inner loop for both shortterm airframe stability (SAS) and long-term flight path control (trim). The center of the inner loop authority is adjusted by positioning of an outer loop in response to signals indicative of long term flight path control errors. In other words when the inner loop is driven too far off center, a function of the outer loop command signals which reposition the center of authority of the inner loop is applied oppositely to the inner loop so that as the outer loop assumes the desired long-term control position, the inner loop is commensurately driven back toward the center of inner loop authority, rather than relying on sensor indications of changes in the airframe conditions to provide reduced error signals to the inner loop. The outer loop recentering of inner loop authority is a function of airspeed, the magnitude of outer loop input commands, anticipated outer loop input commands, and flight conditions indicative of the likelihood of anticipated commands. Specifically, the outer loop is provided with a faster response rate in response to high demand indicated by outer loop input, and by the rate of change of a parameter related to the outer loop input, and the response may be varied in dependence upon the aircraft being above or below a threshold speed. An AFCS satisfying this description is found in U.S. Pat. No. 4,385,355 (Verzella et al., 1983) entitled AUTOMATIC OUTER LOOP CENTERING OF AIRCRAFT INNER LOOP and is incorporated by reference herein. A pitch bias command signal is provided in the AFCS as a function of airspeed multiplied inversely with collective pitch, and as a function of the rate of change of collective pitch stick position, so as to provide positive static pitch trim gradient and decouple collective pitch from the longitudinal cyclic pitch channel at cruise air-speeds. When the pitch bias command signal is of a magnitude and duration that requires authority in excess of that available in the inner-loop, the outer loop recenters the inner loop, assuming a faster response rate as required.

According further to the invention, when the AFCS is operating single-on, the outer loop response is normally delayed for three seconds to allow a pilot time to recover from a hardover. However, when a collective maneuver is being made, the outer loop response is not delayed so as not to interfere with the pitch bias function, especially with regard to collective decoupling.

The present invention may be implemented with analog, digital or computerized signal processing utilizing apparatus and techniques which are well within the skill of the art in the light of the teachings which follow hereinafter. The foregoing and other objects, features and advantages of the present invention will become more apparent in the light of the following detailed description of an exemplary embodiment thereof, as illustrated in the accompanying drawing.

BEST MODE FOR CARRYING OUT THE INVENTION

Figure 1:
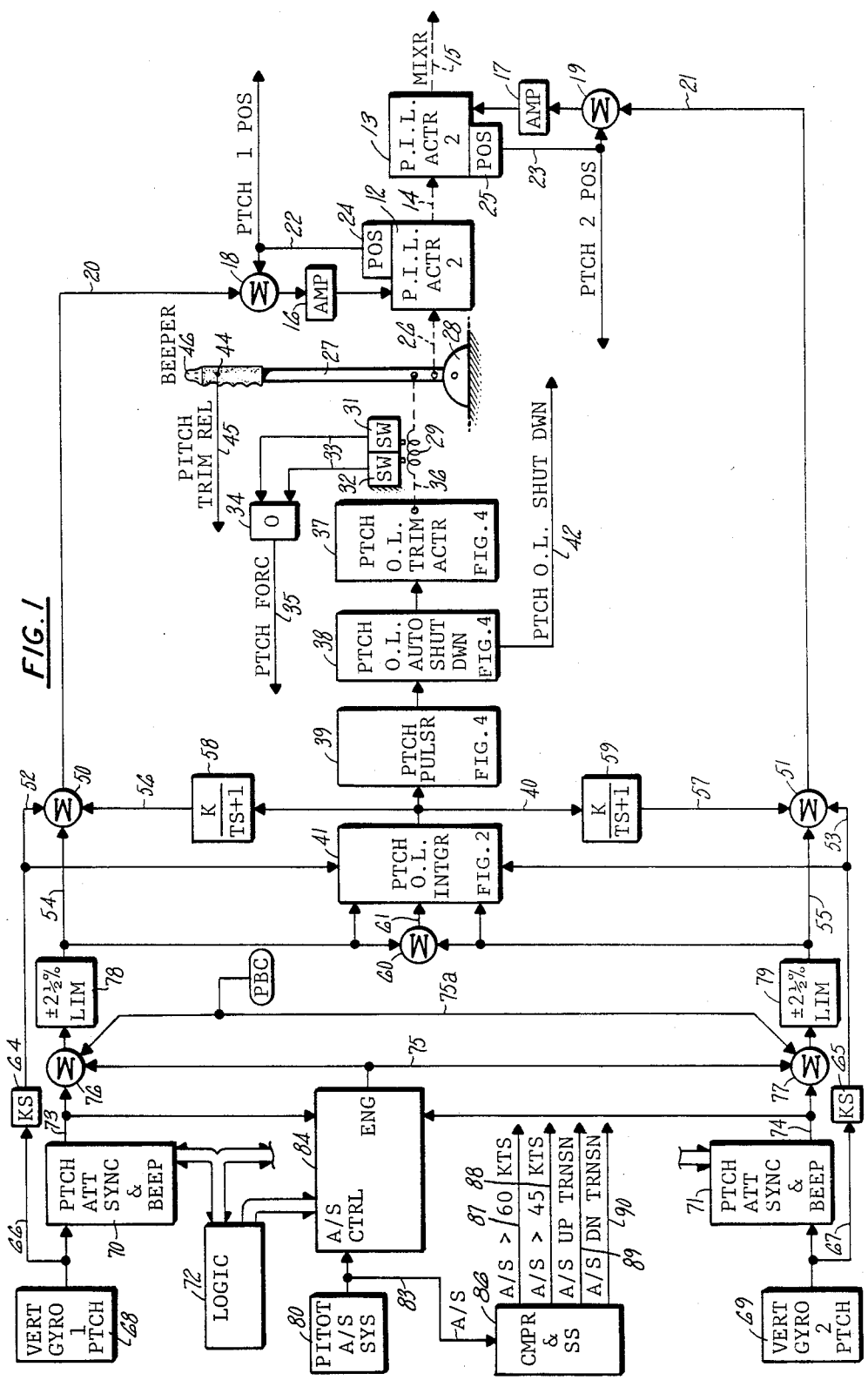
FIG. 1 is a simplified schematic block diagram of the longitudinal cyclic pitch channel of an automatic flight control system in which the present invention may be implemented.

Referring now to FIG. 1, a helicopter longitudinal cyclic pitch control system for controlling the pitch axis attitude of a helicopter, within which the present invention may suitably be implemented includes a pair of inner loop longitudinal cyclic pitch actuators 12, 13 which are connected together by suitable linkage 14 and to a main rotor blade pitch angle swash plate mixer (not shown) by suitable linkage 15. Each of the actuators is driven by a corresponding amplifier 16, 17 in a nulling servo loop fashion. The amplifiers respond to error signals from corresponding summing junctions 18, 19 which provide the amplifiers with a signal indicative of the difference between a pitch command signal on a related line 20, 21 and a signal provided on a related line 22, 23 by a corresponding actuator position sensor 24, 25 which is indicative of the achieved position of the actuator. When the actuators 12, 13 have achieved positions corresponding to the signals on the lines 20, 21 the error signal provided by the summing junctions 18, 19 to the amplifier 16, 17 goes to zero, so the actuators will remain at rest until the signals on the lines 20, 21 are changed (or drift showing up in the lines 22, 23).

The actuators 12, 13 are also connected by mechanical linkage 26 to a cyclic pitch control stick 27 which is pivoted within a gimbal 28 for forward and aft motion against the operation of a trim position spring 29. A pair of switches 31, 32 are disposed on the actuator 37 for detecting motion of the stick 27 against the spring 29 in respective directions. Closure of either switch 31, 32 will provide a signal on a corresponding one of two lines 33 to cause an OR circuit 34 to provide a pitch force signal on a line 35. In various embodiments, the OR function provided by the circuit 34 may simply be implemented by the relationship of the switches 31, 32, as is known in the art.

The cyclic pitch stick 27 is connected by mechanical linkage 36 and the spring 29 to a pitch outer loop trim actuator 37 which is driven through pitch automatic shutdown circuits 38 and pitch pulser circuits 39 by a signal on a line 40 provided by a pitch outer loop integrator circuit 41. These circuits serve to reposition the cyclic pitch stick 27 to a position indicative of the actual commands being provided to the linkage 15 as a consequence of motion of the actuators 12, 13. The pitch auto shutdown circuit 38 provides a pitch outer loop shutdown signal on a line 42. The cyclic pitch stick 27 has a switch 44 that can be closed by a thumb or finger so as to provide a trim release signal on a line 45. The stick 27 also has a "coolee hat" type of four-axis beeper switch 46 that can be moved forward or aft (or right or left) to provide beep signals; in a system of the type described, the beep signals are signals which provide small changes in the attitude reference signals.

The attitude command signals on the lines 20, 21 are each provided by a corresponding summing junction 50, 51, which sum together corresponding pitch rate signals on lines 52, 53, pitch attitude and A/S control signals on lines 54, 55 and outer loop compensation signals on lines 56, 57. The outer loop compensation signals are provided by lag amplifiers 58, 59 which are driven by the output of the pitch outer loop integrator on the line 40.

The signals on the lines 52–55 are applied to the pitch outer loop integrator 41 in order to detect high pitch attitude demand changes and adjust the outer loop rate in response thereto. The pitch attitude signals on the lines 54 and 55 are applied to a summing junction 60, the output of which is applied to the pitch outer loop integrator 41 on a line 61 in order to cause outer loop response. These features are discussed hereinafter.

The signals on the lines 52, 53 are provided by differentiators 64, 65 from gyro pitch signals on lines 66, 67 which are provided by the pitch axis outputs of corresponding vertical gyros 68, 69. The signals on the lines 66, 67 are also compared with attitude reference signals in pitch attitude synchronizing and beep circuitry 70, 71. When the circuits 70, 71 are synchronized, the reference follows (is made equal to) the signal on the corresponding lines 66, 67 indicative of actual pitch angle of the helicopter; when beeping is employed, the reference is forced to equal a greater or lesser pitch angle; when the circuits 70, 71 are not synchronized, they provide pitch error signals on related lines 73, 74 indicative of the difference between the actual pitch angle of the helicopter and the reference helicopter pitch attitude. Logic circuits 72 are connected with the pitch attitude sync and beep circuits 70, 71 to control the operation thereof. In systems of the type disclosed herein, the signals on the lines 73, 74 are summed with a signal on a line 75 and a signal (PBC) on a line 75a in corresponding summing junctions 76, 77, the resultant of which is applied to a related limiter circuit 78, 79 so as to provide the pitch attitude and airspeed control signals on the lines 54, 55 limited to 2½% of total pilot authority. Thus, the short term automatic attitude control which can be provided by means of the actuators 12, 13 is limited to a total of ±5% of pilot authority.

A pitot-static airspeed system 82, of any suitable well known type, provides an airspeed signal on a line 83 to air speed control circuits 84. The airspeed control circuit 84 may also respond to the pitch attitude error signals on the lines 73, 74 so as to provide, over the line 75, increased gain in attitude control when the airspeed control circuitry 84 is engaged. The airspeed signal on the line 83 might be utilized in circuitry 86, which includes compare circuits and single shot circuits (monostable multi-vibrators), or other signal transition detecting circuits, to provide signals on a plurality of lines 87–90 indicative of airspeed being greater than 60 knots or 45 knots, or transitions from below 40 knots to above 40 knots, and transitions from above 45 knots to below 45 knots, respectively. This circuitry may be of the type disclosed in Clelford et al, U.S. patent application Ser. No. 176,832, filed on Aug. 8, 1980, or may be of other types of hardware or software.

The airspeed control circuits 84 and logic circuits 72 are described in detail in U.S. Pat. No. 4,371,937 (Adams et al., 1983) entitled RETAINING AIRSPEED HOLD ENGAGEMENT IN LOW SPEED MANEUVER.

Figure 2:
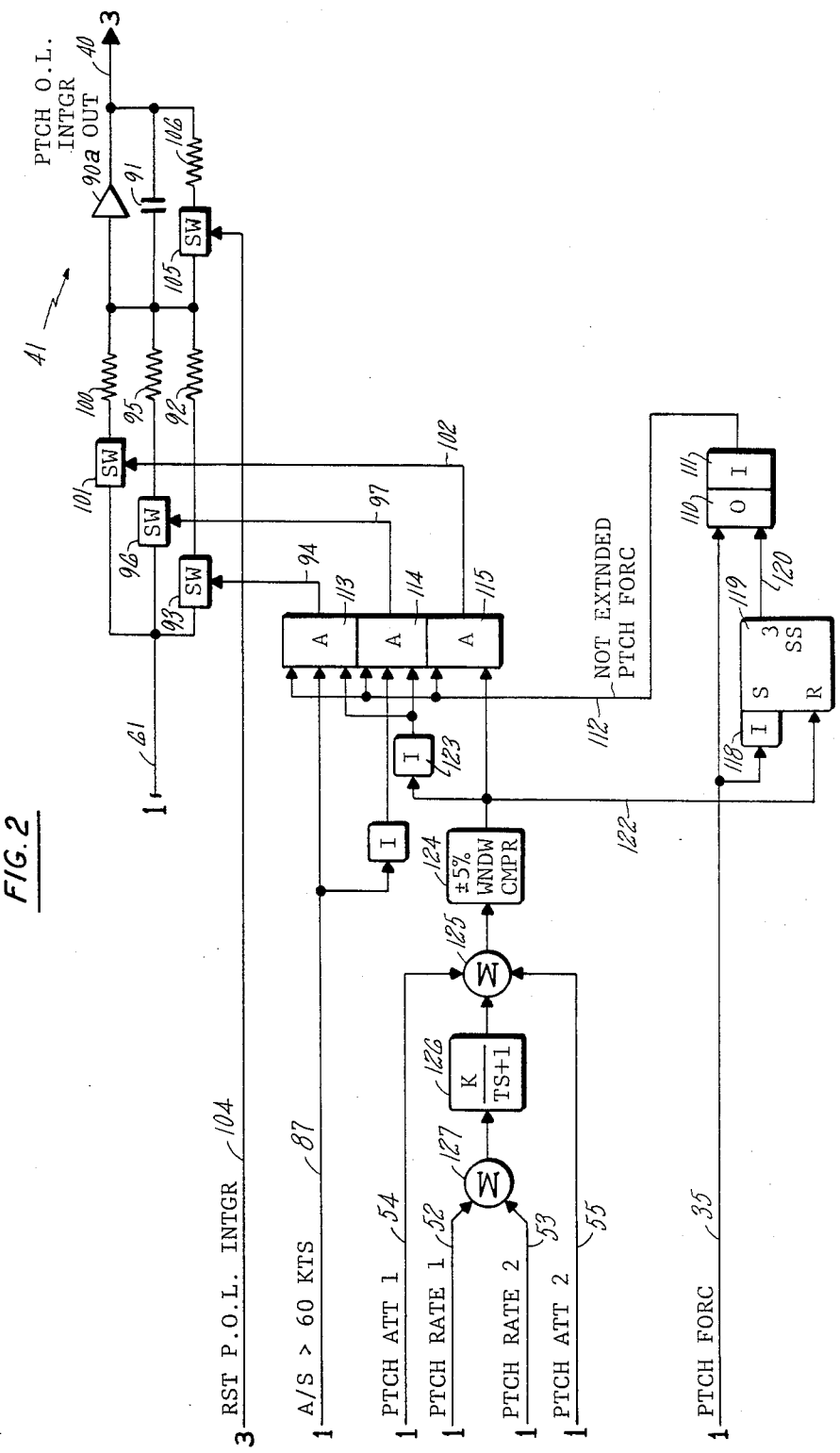
FIG. 2 is a simplified schematic block diagram of a pitch outer loop integrator and control circuits therefore, for use in the system of FIG. 1.

The pitch outer loop integrator 41 is illustrated in detail in FIG. 2. The pitch outer loop integrator 41 comprises an amplifier 90a with a feedback capacitor 91 which forms an integrator, having an effective time constant in dependence upon the value of input resistance connected thereto. In the general case, a first resistor 92 is connected between the output of the summing junction 60 (FIG. 1) on a line 61 and the input of the integrator 41 by a switch 93 which is operated by a signal on a line 94 in response to the airspeed being greater than 60 knots. A second resistor 95 is connected by operation of a switch 96 in response to a signal on a line 97 when the airspeed is less than 60 knots. The resistor 95 may be somewhat less than the resistor 92 so as to provide a faster effective time constant of the integrator 41 at airspeeds above 60 knots than at airspeeds below 60 knots. This allows the outer loop to track somewhat more quickly (in a manner described hereinafter) at higher airspeeds than at lower airspeeds. And, a resistor 100 which is an order of magnitude lower than the resistors 92, 95 may be connected by a switch 101 in response to a signal on a line 102 indicative of a high demand (rapid change in pitch attitude) condition. The integrator 41 is normally reset; for each step-wise movement of the pitch outer loop trim actuator 37; whenever the aircraft is on the ground; during trim release; and whenever the pitch outer loop channel is shut down; all as is described more fully with respect to FIG. 4 hereinafter. The reset function is in response to a reset pitch outer loop integrator signal on a line 104 which causes a switch 105 to place a moderately small resistor 106 in parallel with the capacitor 91 so as to cause it to discharge fully in about 10 milliseconds.

Whenever the pilot provides an input (that is, sufficient force to cause one of the switches 31, 32 to close) and thereby provides the pitch force signal on the line 35, the input to the pitch outer loop integrator 41 is opened so that the integrator holds its present value. This is achieved by providing the pitch force signal on the line 35 to an OR circuit 110 which operates an inverter 111 thereby removing an enabling signal on a line 112 which is applied to a plurality of AND circuits 113–115 so that all of the switches 93, 96, 101 are open. And, whenever the pitch force signal disappears from the line 35, an inverter 118 activates the set input of a 3 second resettable single shot 119 so as to provide a 3 second pulse on a line 120 to the OR circuit 110 so as to continue to inhibit the signal on the line 112 by means of the inverter 111 for an additional 3 seconds. This is to prevent the outer loop from disturbing a situation that the inner loop is handling. The AND circuit 113 normally responds to an airspeed greater than 60 knots signal on the line 87 (when present) to provide the signal on the line 94, and when the airspeed greater than 60 knots signal is not present on the line 87, an inverter 129 will normally cause the AND circuit 114 to provide the signal on the line 97. But, if a high demand condition exists, as indicated by a signal on a line 122, the single shot 119 is immediately reset so that the enabling signal on the line 112 can appear immediately. The high demand signal on the line 122 is provided to the AND circuit 115 and through an inverter 123 to the AND circuits 113, 114, thereby to ensure that the switch 101 will be closed and the switches 93 and 96 will be open during periods of high demand. The high demand signal on the line 122 is generated by a window comparator 124 which has reference voltages therein equivalent to +5% and −5% of full pilot authority. The comparator 124 is fed by a summing junction 125 which sums the pitch attitude signals on the lines 54 and 55 with the output of a lag amplifier 126. The lag amplifier 126 is responsive to the output of a summing junction 127 that provides a signal as the summation of the pitch rate signals on the lines 52, 53. Thus, when the limited pitch attitude error and pitch rate of both channels exceeds 5% of pilot authority, a high demand condition is sensed that allows the pitch outer loop integrator to have a lower time constant (higher gain) so that it will (in a manner described with respect to FIG. 4) step the pitch outer loop trim actuator 37 at a faster rate to follow the high demand. The high demand mode is necessary to accommodate the pitch bias function of this invention. As described hereinbefore, a signal (PBC) is provided on the line 75a to the summing junctions 76, 77 in conjunction with pitch attitude and airspeed control signals to provide automatic attitude control. While limited in the inner loop to an aggregate of 5% authority, the outer loop recentering function provides the increased authority necessary to respond to the pitch bias function, which is as follows.

Figure 3:
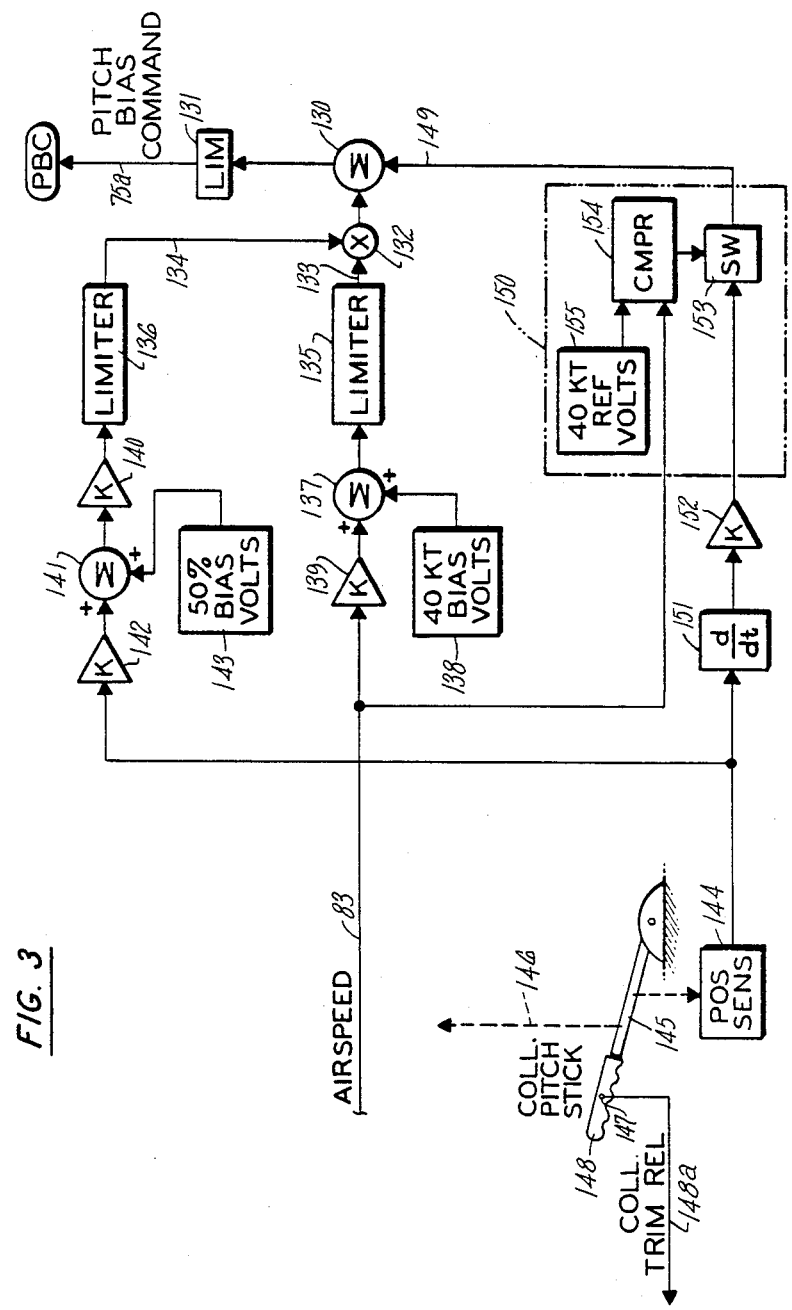
FIG. 3 is a simplified schematic block diagram of a circuit for providing the PBA function of this invention.

With reference to FIG. 3, the pitch bias command on the line 75a is provided by a summing junction 130 through a limiter 131. In the system described in U.S. Pat. No. 4,168,045 (Wright et. al., 1979) rate and authority response limits are imposed by the pitch bias actuator itself. However, in the system of this invention the AFCS is very responsive. Therefore, the pitch bias command is limited to a rate such as five percent per second and an authority such as thirty percent to prevent undesirable inputs to the AFCS. The principal input to the summing junction 130 is provided by a multiplier 132, and represents the product of the outputs on lines 133, 134 by a pair of limiters 135, 136 respectively. The limiter 135 eliminates negative voltage excursions of the output of a summing circuit 137 to provide a cruise speed signal on the line 133 that is a function of airspeed above 40 knots (nominal), as determined by a bias voltage source 138. The airspeed input to the summing circuit 137 is provided through an amplifier 139 from an airspeed signal on the line 83 (from FIG. 1). Because of the bias voltage source 138 the output of the summing junction 137 is negative for all airspeeds less than 40 knots. Since the limiter 135 passes only positive voltages, the input to the multiplier 132 is zero for all airspeeds less than 40 knots and increases with airspeed above 40 knots.

The limiter 136 may be utilized to limit the excursions of voltage output from an amplifier 140, which is in turn responsive to a summing circuit 141 that sums the voltages from an amplifier 142 and from a bias voltage source 143. The amplifier 142 is in turn responsive to a position sensor 144 that provides an output that varies inversely as a function of the position of the collective pitch stick 145. When this invention is implemented in conjunction with an existing AFCS, the position sensor 144 should already exist in the collective channel of the AFCS and may be of a variety of well known devices. Depending on the particular nature of the position sensor 144, the bias voltage 143, amplifiers 140 and 142, and limiter 136 are adjusted so as to provide an inverse collective pitch signal on the line 134 as a function of collective pitch stick position which may vary with the full range of collective stick positions or only a portion thereof. The collective stick 145 is connected to the main rotor blade pitch angle swash plate mixer (not shown) by suitable linkage 146 to provide collective control inputs. A collective channel may also exist in an AFCS (not shown) for which a collective trim release switch 147 is disposed in the handle 148 of the collective stick 145 to provide a trim release signal on a line 148a in a known manner. The function of the trim release signal as it relates to this invention is discussed hereinafter.

The cruise speed signal on the line 133, which increases positively from zero for airspeeds in excess of 40 knots, is multiplied in the multiplier 132 by the inverse collective pitch signal on the line 134 so that the output of the multiplier 132 is zero for all speeds less than 40 knots, and increases as a function of airspeed which is determined by the collective stick position. The polarity of the signal on the line 131 is such as will ultimately cause a nose-up pitch bias command in response to increased airspeed. Therefore, the effect of airspeed on the pitch axis is that an increase in airspeed causes an increase in the nose-up longitudinal cyclic pitch input command provided by the bias of the present invention, which in turn will either (1) lower the airspeed or (2) cause the pilot to overcome the bias with forward motion of the cyclic pitch stick (if he desires speed), thereby maintaining the positive static pitch trim gradient. Without the bias function of the present invention, a helicopter with negative speed stability would respond to a speed decrease with an increase in pitch axis angle (nose-down), causing a further decrease, or would be corrected with aft cyclic stick movement by the pilot.

The effect of collective pitch on this action, however, is opposite; for greater collective pitch stick positions, there is less bias and bias is maximum for the position of zero (or minimum) collective pitch. This tends to decouple collective pitch from the helicopter pitch axis at higher speeds because of the fact that, at any given airspeed, if collective pitch is increased or decreased, the tendency it would have for a nose-up or nose-down condition is offset by respectively decreasing or increasing the nose-up bias provided by the airspeed.

For maximum decoupling of the collective pitch channel from the pitch axis of the helicopter, a collective pitch lead command is provided in response to collective maneuvers as an input to the summing circuit 130 on a line 149 at speeds in excess of 40 knots as determined by a speed switch 150, the collective pitch lead function being provided by a differentiator 151 responsive to the position sensor 144 and fed to the switch 150 by a suitable amplifier 152. The 40 knots speed switch 150 may, for instance, comprise an electronic switch 153 (such as a FET) which is operated by a comparator 154 when the airspeed exceeds that indicated by a reference voltage source 155, all as is known in the art. Otherwise the airspeed switch 150 may comprise any suitable airspeed switch available in the art or may be a logic branch in the context of a digital AFCS.

The invention could be altered so as to be used to decrease an excessively positive static pitch trim gradient, and/or other flight characteristics. Stated alternatively, the utility of the invention is not limited to applications where the amplitude limits, polarity, or relative polarity (e.g., sense of bias response compared to bias-inducing condition and/or sense of speed response compared to sense of collective pitch response) are as described herein.

While the pitch bias command is generated in a known manner, as disclosed in U.S. Pat. No. 4,168,045 (Wright et al., 1979) entitled SPEED AND COLLECTIVE PITCH BIAS OF HELICOPTER LONGITUDINAL CYCLIC PITCH, its function in the context of an AFCS as described hereinbefore in different than when the pitch bias command is supplied to a separate pitch bias actuator.

Figure 4:
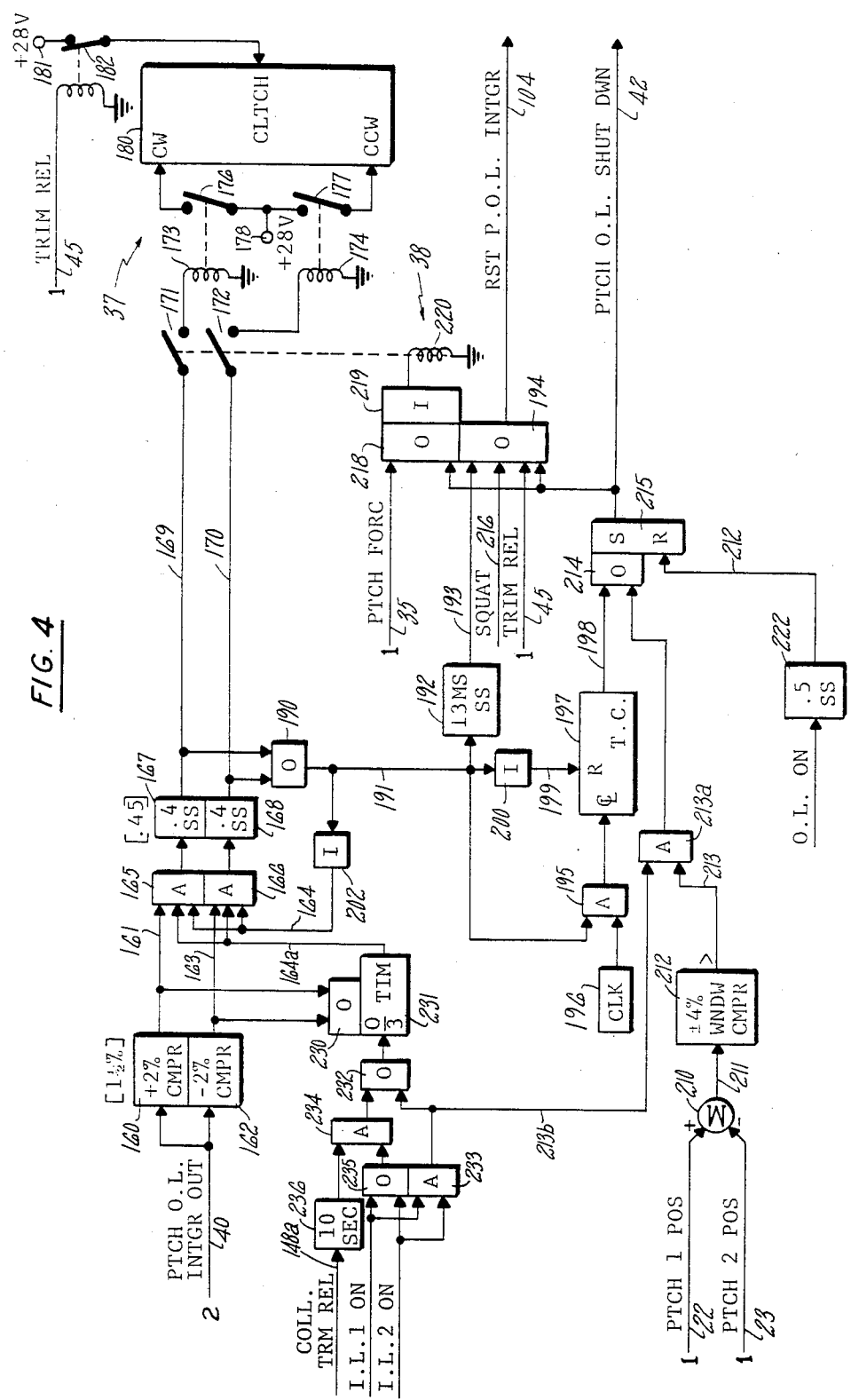
FIG. 4 is a simplified schematic block diagram of pulser, shutdown and trim actuator control circuits for use in the system of FIG. 1.

The pitch pulser 39, pitch outer loop automatic shutdown circuits 38 and pitch outer loop trim actuator 37 are illustrated in detail in FIG. 4. Whenever the summation of limited pitch attitude commands on the lines 54, 55 (FIG. 1) provided on the line 61 by the summing junction 60 are other than zero, the pitch outer loop integrator 41 will integrate those signals (assuming presence of correct control signals described with respect to FIG. 2). If the signals are consistently in the same direction (forward or aft), the pitch outer loop integrator output signal on the line 40 will eventually reach a magnitude equivalent to 2% of full pilot authority in either the forward direction or the aft direction. If in the forward direction, this will cause a comparator 160 (which includes a reference voltage equal to +2% of pilot authority) to provide a signal on a line 161. If in the aft direction, it will cause a comparator 162 (which includes a reference voltage equivalent to −2% of full pilot authority) to provide a signal on a line 163. In the normal case there are also signals on a line 164 and a line 164a so that a related one of a pair of AND circuits 165, 166 will initiate a corresponding 4/10 of a second single shot 167, 168 to provide a pulse on a corresponding line 169, or 170. Assuming that a pair of normally open contacts 171, 172 are closed, a related relay coil 173, 174 will be energized. This will cause a corresponding normally open contact 176, 177 to close and apply power from a normal source 178 (such as ±28 volts) to either a clockwise or counterclockwise input of a rotary actuator 180 which can move the cyclic pitch stick 27 (FIG. 1) in either direction through the spring 29. The actuator 180 is also provided with a clutch which releases the linkage 36 (FIG. 1) from the movable armature of the actuator whenever a clutch engage input powered from a suitable source 181 is removed by opening the normally closed relay contact 182. One example of this type of rotary actuator is Model No. L109 manufactured by Sfena. Of course, other rotary and linear actuators (either electrical or hydraulic in suitable cases) may be utilized wherever any implementation of the invention warrants it.

The generation of a pulse on either of the lines 169, 170, as a consequence of the integrating in either the forward or aft direction to the extent of 2% of pilot authority, will cause an OR circuit 190 to provide a signal on a line 191 indicative of the actuator having had one step-inducing pulse applied thereto. The foremost-function of the signal on the line 191 is to activate a 13 millisecond single shot 192 to provide a pulse on a line 193 which, through an OR circuit 194 provides the reset pitch outer loop integrater signal pulse on the line 104. In FIG. 2, this activates the switch 105 and causes resetting of the pitch outer loop integrator 41. Thus, each time that the total pitch attitude command has integrated to 2% of pilot authority, the actuator 180 is stepped one increment, and the integrator 41 is reset.

In order to ensure that neither of the single shots 167, 168 get locked on in a hard-over situation, thereby to drive the actuator 180 and push the cyclic pitch stick in one direction or the other continuously, a one second alarm timer is provided. This includes, in the sample herein, an AND circuit 195 responsive to each pulse on line 191 to pass signals from a clock circuit 196 to a resettable counter 197 at a rate such that it will reach a terminal count and provide a signal on a line 198 in about one second, unless a signal is applied to its reset input on a line 199 by an inverter 200 in response to the signal on the line 191 (indicating absence of both of the pulses on lines 169 or 170) prior to reaching its terminal count. Because leading edge detecting single shots 167, 168 are utilized, it is possible that the rate of integration could be sufficiently fast so as to provide an output from one of the comparators 160, 162, a second time within 6/10 of a second of a first time of providing such an output. Thus one of the AND circuits 165, 166 could provide a voltage level shift into the related single shot 167, 168 during the period of time while the single shot is still timing out. In such a case, that occurrence would be lost and would not cause a corresponding second pulse on one of the lines 169, 170 so that the position of the actuator 180 would begin to lag the desired position. Since this occurrence also prevents a reset of the integrator, the trip level is not crossed again. It could cause no further pulse for some period of time (until integrator output decreased below the 2% comparator level), so that the outer loop would not catch up to the inner loop as desired. To avoid this situation, the signal on the line 191 is passed through an inverter 202 so as to block the AND circuits 165, 166 during the period of time-out of either of the single shots 167, 168. Then, when the 4/10 of a second pulse ends on either of the lines 169,170 the inverter 202 will again provide the signal on the line 164 causing one of the AND circuits 165, 166 to provide a level shift at the input of the related single shot 167, 168 and thus provide the desired pulse on one of the lines 169, 170. Thus the pulses on the lines 169, 170 may lag up to about 4/10 of a second the firing of one of the comparators 160, 162 without losing the occurrence of the pulse altogether. In an exemplary embodiment of the invention, the circuitry may be arranged so that with the high demand signal present on the line 122 (FIG. 2), with a full 5% of authority (the summation of the 2½% limited pitch attitude commands on the lines 54, 55, FIG. 1) the integrator will reach the 2% of authority necessary to cause a pulse in about 0.4 second. This yields about 5.0% per second, and about 2% per pulse.

As illustrated in FIG. 1, the automatic control over pitch attitude is effected by means of the pitch inner loop actuators 12, 13 which add and subtract mixer inputs from a nominal position established by the position of the outer loop (the cyclic pitch stick 27 and the pitch outer loop actuator 37). If one of the pitch inner loop actuators 12, 13 (or the circuitry providing commands thereto) fails or has a significant gain change, the other actuator will, within the limits of the system, provide sufficient inputs to the mixer to largely offset those provided by the failed actuator. This is called an "on/on" type of system, where one actuator normally supplies only half of the input. Most pitch inner loop actuator faults will be of the type occurring either within the actuator (whether the actuator becomes open and cannot move or exhibits a hard-over condition driving to one of its stops) and, faults could occur in the closed servo loop (those portions shown to the extreme right in FIG. 1). Diagnostic apparatus for determining the particular failure or nature of it would be complex and, when not provided, it is assumed that the pitch attitude signals trying to drive both actuators will reflect the fact that one of them is hard-over, so that the aircraft attitude is lagging the commands, causing large inputs to the outer loop centering system. Thus, if a failure of one of the actuators occurs, the signals feeding the outer loop centering system will cause the outer loop centering system to tend to track the failed actuator, making things even worse.

To avoid having the outer loop centering system track a failed inner loop actuator, the actuator position signals on the lines 22, 23 are subtracted in a summing junction 210 and a signal indicative of the difference between the two actuator positions is applied on a line 211 to a window comparator 212 having reference voltages therein equivalent to ±4% of full pilot authority. Therefore, should the pitch actuator positions differ by more than 4% of pilot authority, the window comparator 212 will provide a signal on a line 213 to an AND circuit 213a which will cause an OR circuit 214 to set a pitch outer loop shutdown bistable device 215 and thereby provide the pitch outer loop shutdown signal on the line 42. This applies to the case when both inner loops are on, as indicated by a signal on a line 213b to the AND circuit 213a. This bistable device 215 can also be set through the OR circuit 214 by the signal on the line 198 indicative of the fact that one of the four tenths second single shots 167, 168 has failed in the ON condition.

The pitch outer loop shutdown signal on the line 42 is applied to the OR circuit 194 and therefore will cause resetting of the pitch outer loop integrator as a consequence of the signal on the line 104, in a manner described with respect to FIG. 2 hereinbefore. The OR circuit 194 will also cause resetting of the pitch outer loop integrator whenever the aircraft is on the ground, as indicated by a squat signal on a line 216, and whenever trim release is depressed, as indicated by the signal on the line 45.

The pitch outer loop shutdown signal on the line 42 is also applied to an OR circuit 218, along with the pitch force signal on the line 35, to cause an inverter 219 to cease to provide current to a relay coil 220, thereby causing the contacts 171, 172 to open, so that any pulses on the line 169, 170 will be foreshortened at the actuator 37, and no further pulses can be applied. Of course, with the pitch outer loop integrator in the continuously reset state as a consequence of the signal on the line 104, which is also caused by the pitch outer loop shutdown signal 42, there could be no further pulses generated on the lines 169, 170 during pitch outer loop shutdown. And, whenever the contacts 171, 172 are opened as a consequence of the pitch force signal on the line 42, the pitch outer loop integrator input is open as a consequence of the inverter 111 (FIG. 2) as described hereinbefore. The pitch outer loop shutdown bistable device 215 is reset by a half-second pulse on a line 221 from a single shot 222 whenever the cyclic pitch outer loop function is cycled ON by the pilot.

In the case of single-on operation, when the pilot (or a diagnostic circuit) has shut off a faulty innerloop, a situation exists wherein a failure in the remaining inner loop, and consequent response by the outer loop, would cause a sudden and rapid deterioration of aircraft attitude. Therefore, it is known to impose a delay on outer loop commands when the AFCS is operating single-on. As shown in FIG. 4 an OR circuit 230 is responsive to the outputs of the comparators 160, 162 in order to start a timer 231, the output of which is provided on the line 164a to maintain the outputs of the AND circuits 165, 166 at ZERO, thereby preventing outer-loop pulses from being generated by the single shots 167, 168. When the timer 231 times out, it resets itself. The timer 231 operates in one of two modes, ZERO seconds or THREE seconds, as determined by an OR circuit 232. In the ZERO second mode, the timer 231 is, for all practical purposes, passive; that is, its output parallels its input and is high whenever either of the lines 161 or 163 are high, thereby not blocking the outputs of the AND circuits 165, 166. The output of the OR circuit 232 is logic ONE and provides for the ZERO second mode in two cases; when both inner loops are on, as indicated by the output of an AND circuit 233, or when only one inner loop is on (single-on) and other conditions are satisfied as indicated by the output of an AND circuit 234.

The THREE second mode is normally provided when the AFCS is operating single on to delay response in the outer loop. When an inner loop is shut down, the output of the AND circuit 233 goes low, but the output of an OR circuit 235 remains high, so long as one inner loop is on. However, the output of the AND circuit 234 is normally low so, for single on operation, the output (low) of the OR circuit 232 triggers the THREE second mode in the timer 231. This is a safety feature, the impetus for which is in part provided for by F.A.A. Airworthiness criteria for helicopter instrument flight which basically require that the helicopter not be permitted to assume a dangerous attitude within three seconds in coupled (e.g. navigation mode) single on flight. The straightforward "fix" is to simply delay any outer loop commands for three seconds.

In the THREE second mode, the timer 231 responds to the signals on the lines 161, 163, but delays an output on the line 164a for three seconds. Therefore, for the first three seconds after a signal is provided on a line 161, 163, no pulses are provided by the single-shots 167, 168 and the outer loop actuator does not respond. After three seconds have elapsed, the AND circuits 165, 166 are enabled and immediately a pulse is generated by the single-shots 167, 168 and the integrator is reset.

Clearly, the imposition of a three second delay for single-on operation renders the pitch bias function useless, except for a limited, pre-saturation response in the inner loop (up to 2½% authority). The delay is inapposite in the context of maneuvering flight wherein the pilot can readily respond to a hardover and AFCS responsiveness to the pitch bias command is very desirable to reduce workload.

Therefore, when operating single on and a collective maneuver is made, as indicated by the collective trim release signal on the line 148a, the output of the AND circuit 234 goes high and, via the OR circuit 232, initiates the ZERO second mode in the timer 231.

It is not only desirable to inhibit the three second delay when collective maneuvers are being made, but also for a certain time thereafter. Thereby, for the certain time (e.g. ten seconds) after a collective input is made, the trim actuator (outer loop) can respond to the pitch bias command. Thus, attitude and airspeed is maintained. Therefore, the collective trim release signal is provided through a delay circuit 236 which passes the signal immediately and retains an output for a certain time thereafter, as though the input signal were still present.

The present invention may be practiced utilizing simple hydraulic actuators, simple AC or DC rotary or linear (jackscrew) actuators and the like, provided only that some provision is made for long term drift of such systems. As an example, the drift may be accommodated by a simple servo loop (such as that shown for the inner loop actuators) to maintain a desired commanded position. On the other hand, an open loop system could be utilized, with autosynchronizing between the inner loop and the outer loop performed in a manner analogous to that disclosed and claimed with respect to an airspeed/attitude system in U.S. Pat. No. 4,385,356 (Verzella et al., 1983) entitled NON-SATURATING AIRSPEED/ATTITUDE CONTROLS. In such a case, sensing that the inner loop actuators have achieved some percentage (such as 80%) of their authority in either direction could cause a specific, opposite corrective command to be summed into the input of the pitch outer loop integrator, which would drive the outer loop in the direction in which the inner loop actuators are reaching full authority, and the lagged outer loop input to the inner loop on lines 56, 57 would move the inner loop actuators back toward the center of their authority, in a fashion described hereinbefore.

The disclosed embodiment employs integral gain (41) of the outer loop command (61), but the invention may be also practiced utilizing a combination of integral and proportional gain, or, where suitable and permissible, simply proportional gain.

The invention provides an adaptive outer loop recentering of the inner loop. At cruise airspeeds (above 60 knots) the outer loop is caused to respond more quickly than at low airspeeds (or hover, in a helicopter). Similarly, when high demand is indicated (by the signals on the lines 54, 55) or anticipated (by the signals on the lines 52, 53), the outer loop has a higher rate of response. In the exemplary embodiment, these adaptive rates of response are implemented by adjusting the effective time constant (gain) of the pitch outer loop integrator.

The disclosed embodiment includes providing to the inner loop, a lagged function (by amplifiers 58, 59, FIG. 1) of the outer loop command. As the integrator output builds up, the amplifiers 58, 59 drive the outer loop in the desired-response direction (in phase with the commands on lines 54, 55). As the integrator is reset, the fall in the integrator output causes a command component through the amplifiers 58, 59 to command the actuators back by 2% of authority (opposite to the desired-response commands), just as the outer loop steps forward by 2% of authority. Thus, the inner loop actuators 12, 13 are actually driven back toward their center positions commensurately with the outer loop assuming the authority from the inner loop. Stated simply, for each increment of command put into the outer loop, a corresponding increment of command is taken away from the inner loop. However, if the lagged outer loop command is not provided to the inner loop, the same effect would be achieved by adjustments in the aircraft attitude. For instance, for each pulse on the line 40, the outer loop would have an input command to the mixer in the same direction as that in which the inner loops had previously provided a command. This would cause the attitude of the aircraft as sensed by the vertical gyro (68, 69) to be different from the desired attitude as established by the attitude reference signals in the circuit 70, 71. This would cause a countermanding input over the lines 52–55 which would drive the inner loop back toward its centered position in a fashion to remove from the mixer linkage 15 the same amount of input as was applied thereto by movement of the outer loop linkage 36, 26. Thus the system will provide automatic centering of the inner loop in response to outer loop changes through the attitude response of the aircraft itself. The provision of the lag amplifiers 58, 59 simply takes out the requirement for aircraft attitude changes to achieve commensurate centering of the inner loop, causing the attitude of the aircraft to remain substantially constant, or smoothly transitioning, rather than having abrupt attitude changes to accommodate recentering of the inner loop in a pulse fashion. In a linear, nonpulsed version of the present invention, the recentering as a consequence of aircraft attitude (without the outer loop input to the inner loop) would be smoother, but would add additional dynamic stability complexity to the circuitry. Of course, the invention may be practiced with single or triplex inner loops, with dual outer loops, etc.

The foregoing description is in simplified block form, the detailed circuitry being described with respect to simple positive logic utilizing either relay contacts or switches to open and close certain paths, summing junctions (which are understood to be combinations of resistors at the correct inverting and noninverting inputs of suitable amplifiers) single shots which may require reset dominance or may not need one, bistable devices, and the like. Many of the foregoing functions can obviously be achieved in a simpler fashion by using more true and complement outputs and fewer inverters; in many instances the positive logic disclosed may readily be reworked into inverting logic to be more suitably applicable to available hardware chips. The description is, therefore, principally in terms of function achieving blocks, and it should be understood that numerous variations may be utilized for achieving the same or equivalent functions and combinations of functions within the skill of the art. In addition, the functions of the foregoing apparatus (other than the mechanical functions and those functions which directly interface with the mechanical functions) may readily be implemented by utilization of a suitably programmed digital computer. The conversion of the discrete and analog functions described herein to digital functions performed by suitable software in a computer is well within the skill of the art, particularly in the light of the teachings of equivalency set forth in a commonly U.S. Pat. No. 4,382,283 (Clelford et al., entitled Airspeed Acquisition and Retention System.

The invention may be practiced in automatic flight control systems having single channels of inner loop or of outer loop, dual channels of inner loop or of outer loop, or more channels of either, in various combinations. The exemplary conditions, magnitudes, durations and relationships may of course be varied to suit any usage of the invention. Aspects of the invention may be practiced in automatic control of various functions, in addition to the illustrative functions described herein.

Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

We claim:

1. An improved system for automatically positioning aerodynamic surfaces in the longitudinal pitch control axis of a helicopter having a longitudinal cyclic pitch control channel and a collective pitch control channel, comprising:

a sensor responsive to the longitudinal pitch attitude of the aircraft for providing an actual pitch angle signal indicative of the magnitude thereof;

a fast, inner loop actuator for changing the position of said aerodynamic surfaces across a limited authority range of positions which is a fraction of the total permissible range of positions thereof;

a slow, outer loop actuator connected to said inner loop actuator for adjusting the position of said inner loop actuator relative to the position of said aerodynamic surfaces throughout a full authority range of positions equal to the total permissible range of positions thereof, to thereby reposition the center of said limited authority range relative to said full authority range; and means for providing a reference pitch angle signal indicative of a desired longitudinal pitch attitude of said aircraft;

means for providing a pitch error signal indicative of the difference between the actual pitch angle signal and the reference pitch angle signal;

means responsive to the pitch error signal for providing to said inner loop actuator a proportional command signal indicative of the magnitude and sense of the pitch error signal pitch angle to adjust the position of said asrodynamic surfaces in a first direction, depending on the sense of said actual pitch angle signal, to cause said actual pitch angle signal to approach equality with said reference pitch angle signal;

means for providing to said inner loop actuator a rate command signal indicative of the magnitude and sense of the rate of change of said actual pitch angle signal to adjust the position of said aerodynamic surfaces in a second direction, depending on the sense of said rate of change, to cause the rate of change of said actual pitch angle signal to approach nil;

integrator means for providing to said outer loop actuator an outer loop command signal indicative of the magnitude and sense of difference between said actual pitch angle signal and said reference pitch angle signal to adjust the position of said inner loop actuator and therefore of said aerodynamic surfaces in said first direction;

means for providing an inner loop recentering signal to said inner loop actuator in dependence on the magnitude of said outer loop command signal but of a sense to adjust the position of said aerodynamic surfaces in a direction opposite to said first direction by substantially the same amount as said outer loop actuator adjusts the position of said inner loop actuator and therefore of said aerodynamic surfaces, whereby the position of said inner loop actuator is adjusted to be substantially at the center of said limited authority range without significant perturbation of the position of said aerodynamic surfaces;

airspeed sensing means for sensing airspeed of the helicopter and providing an airspeed signal in response thereto;

cruise speed means responsive to said airspeed signal for providing a cruise speed signal which is a function of airspeed above a threshold speed;

means connected to the collective pitch control channel and responsive to the collective pitch command indicated thereby for providing a collective pitch signal indicative thereof;

means responsive to said collective pitch signal for providing an inverse collective pitch signal which varies inversely with the collective pitch command;

bias command means for multiplying said cruise speed signal with said inverse collective pitch signal so as to provide a pitch bias command signal as a compound function of airspeed and the inverse of collective pitch; and means for adding the pitch bias command signal to the pitch error signal.

2. A system according to claim 1 wherein said fast inner loop actuator is a dual inner loop actuators acting in unison, further comprising:

means for providing a delay signal in response to a shutdown of one of said dual inner loop actuators;

means for providing a collective trim release signal indicative of a pilot releasing trim and maneuvering; and means connected to said integrator means for delaying provision of the outer loop command signal in response to said delay signal, unless said collective trim release signal is present.

* * * * *